(12) United States Patent
Gleason et al.

(10) Patent No.: US 9,746,314 B2
(45) Date of Patent: Aug. 29, 2017

(54) SCANNING LASER TARGET SPHERE WITH INTERNAL CONCENTRIC MOUNT

(71) Applicants: Joseph A. Gleason, Whittier, CA (US); Eugene A Gleason, Jr., Huntington Park, CA (US)

(72) Inventors: Joseph A. Gleason, Whittier, CA (US); Eugene A Gleason, Jr., Huntington Park, CA (US)

(73) Assignee: MICRO SURFACE ENGINEERING, INC., Los Angeles, CA (US)

( * ) Notice: Subject to any disclaimer, the term of this patent is extended or adjusted under 35 U.S.C. 154(b) by 39 days.

(21) Appl. No.: 14/922,335

(22) Filed: Oct. 26, 2015

(65) Prior Publication Data

US 2017/0115113 A1 Apr. 27, 2017

(51) Int. Cl.
*G01B 11/14* (2006.01)
*G01C 15/06* (2006.01)

(52) U.S. Cl.
CPC ............. *G01B 11/14* (2013.01); *G01C 15/06* (2013.01)

(58) Field of Classification Search
CPC ......... G01B 11/14; G01C 15/02; G01C 15/06
USPC .......................................................... 33/293
See application file for complete search history.

(56) References Cited

U.S. PATENT DOCUMENTS

| | | | | |
|---|---|---|---|---|
| 2,904,890 | A * | 9/1959 | Vajda | F42B 15/00 33/293 |
| 3,188,739 | A * | 6/1965 | Olsen | G01C 15/002 33/275 R |
| 4,539,753 | A * | 9/1985 | Fitzpatrick | G01B 3/30 33/520 |
| 5,861,956 | A * | 1/1999 | Bridges | G01B 11/002 33/293 |
| 5,893,214 | A * | 4/1999 | Meier | G01B 11/005 33/293 |
| 6,299,122 | B1 | 10/2001 | Bame | |
| 6,427,356 | B1 * | 8/2002 | Schamal | G01B 5/0025 33/520 |
| 6,813,840 | B1 * | 11/2004 | Delmas | G01C 15/02 33/293 |
| 7,110,194 | B2 | 9/2006 | Hubbs | |
| 8,467,072 | B2 * | 6/2013 | Cramer | G01B 11/03 356/614 |
| 8,503,053 | B2 | 8/2013 | Graham et al. | |
| 8,567,966 | B2 * | 10/2013 | Hubbs | G02B 5/126 359/543 |
| 2011/0235143 | A1 | 9/2011 | Graham et al. | |
| 2016/0282525 | A1 * | 9/2016 | Evans | G02B 5/124 |

FOREIGN PATENT DOCUMENTS

CH  DE 4013576 A1 * 1/1992 ............. G01C 15/02

* cited by examiner

*Primary Examiner* — Christopher Fulton
(74) *Attorney, Agent, or Firm* — Kenneth L. Green; Averill & Green

(57) ABSTRACT

A laser target sphere is used in conjunction with a laser scanner. The target sphere has an ideal lambertian reflectance appropriate for laser scanning systems facilitating the laser scanner finding the center of the target sphere. The target sphere includes an internal kinematic mount configured to concentrically mount the target sphere to a Spherical Mounted Retroreflector (SMR) providing a same center location of the two spheres. By adapting the target sphere to mount concentrically on the SMR, the laser scanner and target sphere system can use the same points defined for the SMR.

19 Claims, 3 Drawing Sheets

SCANNING LASER TARGET SPHERE WITH INTERNAL CONCENTRIC MOUNT

BACKGROUND OF THE INVENTION

The present invention relates to precision measurements and in particular to laser target spheres.

Laser target spheres have become a very popular position measuring device. Laser tracking devices may be used to precisely measure the position of the center of the target sphere. However a desire is present for a target sphere which may be mounted to a second sphere and result in the two spheres having the same center point.

BRIEF SUMMARY OF THE INVENTION

The present invention addresses the above and other needs by providing a laser target sphere which is used in conjunction with a laser scanner. The target sphere has an ideal lambertian reflectance appropriate for laser scanning systems facilitating the laser scanner finding the center of the target sphere. The target sphere includes an internal kinematic mount configured to concentrically mount the target sphere to a Spherical Mounted Retroreflector (SMR) providing a same center location of the two spheres. By adapting the target sphere to mount concentrically on the SMR, the laser scanner and target sphere system can use the same points defined for the SMR.

In accordance with one aspect of the invention, there is provided a target sphere having an internal kinematic mount. The internal kinematic mount comprises a cavity in the target sphere containing three positioning spheres. The three positioning spheres are located in the target sphere to concentrically position the target sphere on a smaller sphere, preferably on a Spherical Mounted Retroreflector (SMR).

In accordance with one aspect of the invention, there is provided a target sphere having a magnet internally mounted to retain the target sphere on a Spherical Mounted Retroreflector (SMR). The magnet is positioned to attract but not touch the SMR, thus retaining the SMR against three positioning spheres to concentrically mount the target sphere on the SMR.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement. The terms vertical and horizontal are with respect to the drawings, and a device rotated to different orientations is intended to come within the scope of the present invention.

Figure 1A:
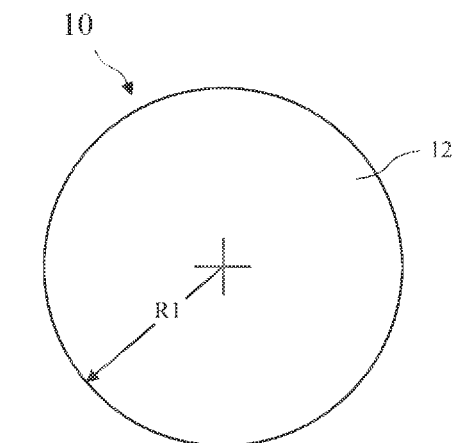
FIG. 1A is a top view of a scanning laser target sphere according to the present invention.
Figure 1B:
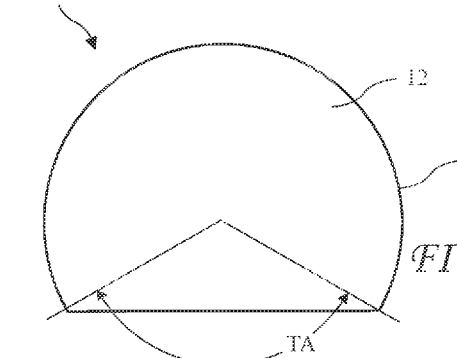
FIG. 1B is a side view of the scanning laser target sphere according to the present invention.
Figure 1C:
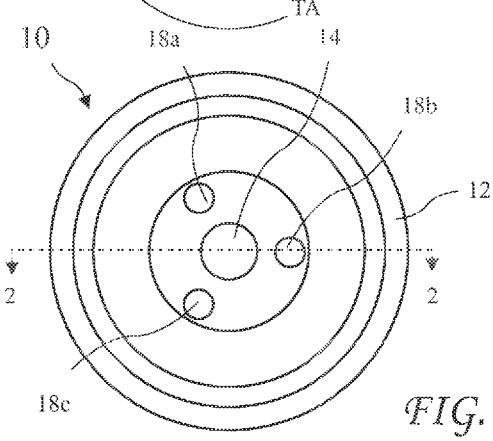
FIG. 1C is a bottom view of the scanning laser target sphere according to the present invention.
Figure 2:
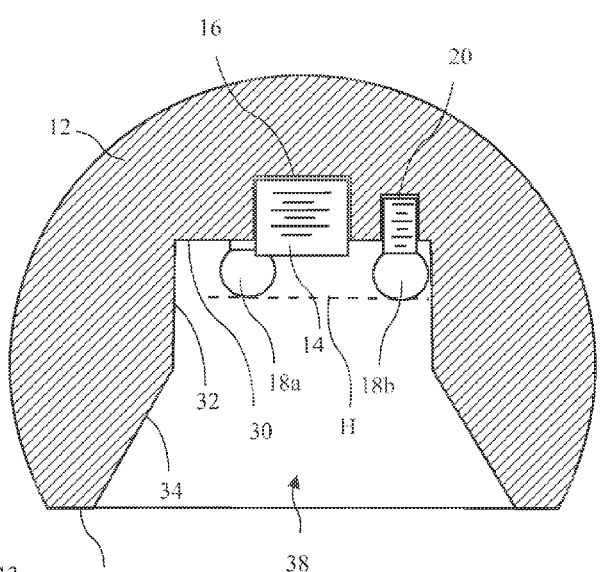
FIG. 2 is a cross-sectional view of the scanning laser target sphere according to the present invention taken along line 2-2 of FIG. 1C.

A top view of a scanning laser target sphere 10 according to the present invention is shown in FIG. 1A, a side view of the scanning laser target sphere 10 is shown in FIG. 1B, a bottom view of the scanning laser target sphere 10 is shown in FIG. 1C, and a cross-sectional view of the scanning laser target sphere 10 taken along line 2-2 of FIG. 1C is shown in FIG. 2. The scanning laser target sphere 10 includes a body 12 having an exterior as a truncated sphere 13 having a radius R1 preferably between 1.75 and 8 inches and a truncation angle TA preferably less than 180 degrees, and more preferably between 116 degrees (for a 3.5 inch diameter scanner laser target sphere) and about 152 degrees (for an 8 inch diameter scanner laser target sphere). Preferably, the height H of the center of the scanner laser target sphere 10 above the base 36 is at least 0.92 inches, and more preferably between 0.92 inches and 0.98 inches, and most preferably 0.95 inches. The body 12 may be made from various materials suitable for laser scanning, and is preferably made from aluminum or titanium. The body 12 defines a recess 38 in the bottom of the body 12, having a frusto conical portion 34, then a cylindrical portion 32, and a ceiling 30. An annular ring surface 36 surrounds the annular opening 38.

Three positioning members 18a, 18b, and 18c threadedly reside in cavities 20 and reach down from the ceiling 30 into the cavity 38. The positioning members 18a, 18b, and 18c are preferably spaced 120 degrees apart and are vertically positioned in a common horizontal plane H. A magnet 14 threadedly resides in a cavity 16 in the ceiling 30 and reach down from the ceiling 30 into the cavity 38. While the positioning members 18a, 18b, and 18c and magnet 14 preferably threadedly engage the body 12, those skilled in the art will recognize various way to attach the positioning members 18a, 18b, and 18c and magnet 14 to the body, and a scanning laser target sphere 10 having the positioning members 18a, 18b, and 18c and magnet 14 attached in other manners is intended to come within the scope of the present invention.

Figure 3:
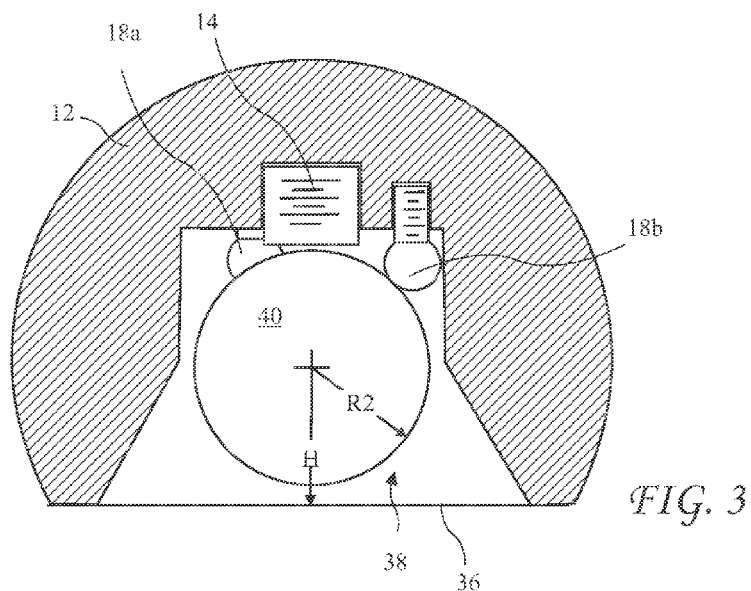
FIG. 3 is a cross-sectional view of the scanning laser target sphere according to the present invention taken along line 2-2 of FIG. 1C carried on a Spherical Mounted Retroreflector (SMR).

A second cross-sectional view of the scanning laser target sphere 10 taken along line 2-2 of FIG. 1C carried on a Spherical Mounted Retroreflector (SMR) 40 is shown in FIG. 3. Those skilled in the art will recognize an SMR as a commonly used reflective target, having a radius R2 of preferably 0.75 inches. The positioning members 18a, 18b, and 18c are configured to concentrically position the scanning laser target sphere 10 on the SMR 40, thereby taking advantage of the positioning characteristics of the SMR 40. Thus, determining the position of the scanning laser target sphere 10 also determines the position of the SMR 40. The magnet 14 retains the scanning laser target sphere 10 on the SMR 40 but is adjusted to avoid touching the SMR 40 which resides against the three positioning members 18a, 18b, and 18c.

Figure 4A:
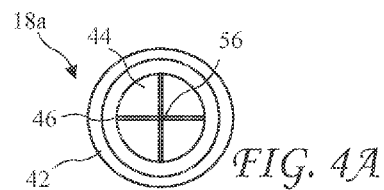
FIG. 4A is a top view of one of three positioning members according to the present invention.
Figure 4B:
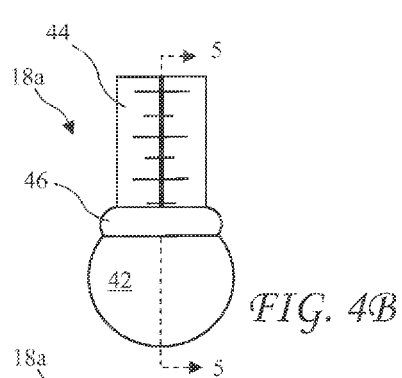
FIG. 4B is a side view of one of the three positioning members according to the present invention.
Figure 4C:
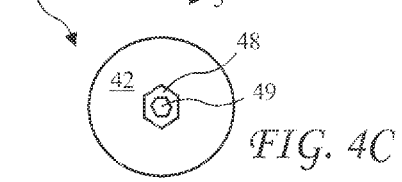
FIG. 4C is a bottom view of one of the three positioning members according to the present invention.

A top view of the positioning member 18a is shown in FIG. 4A, a side view of the positioning member 18a is shown in FIG. 4B, and a bottom view of the positioning member 18a is shown in FIG. 4C. The positioning members 18b and 18c are of the same design. The positioning member 18a includes a spherical portion 42 and threaded cylindrical post 44. The spherical portion 42 is preferably attached to the post 44 by brazing 46. A non-round, preferably hexagonal, passage 48 aligned with the post 44 extends through the spherical portion 42. The passage 48 is configured to accept a tool, for example an Allen wrench, to rotate the position member to adjust the depth of the positioning member in the cavity 38 to concentrically position the scanning laser target sphere 10 on an SMR 40.

Figure 5A:
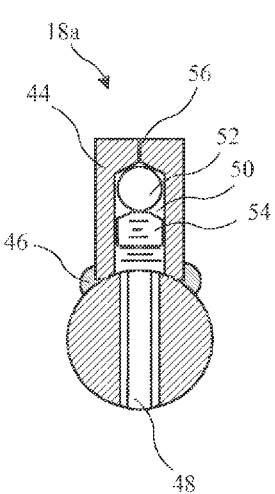
FIG. 5A is a cross-sectional view of one of the three positioning members according to the present invention taken along line 5-5 of FIG. 4B.
Figure 5B:
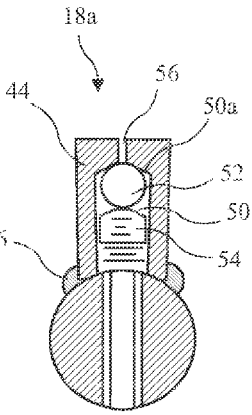
FIG. 5B is a cross-sectional view of one of the three positioning members according to the present invention taken along line 5-5 of FIG. 4B with an expanded post.

A cross-sectional view of the positioning member 18a taken along line 5-5 of FIG. 4B is shown in FIG. 5A and a second cross-sectional view of the positioning member 18a taken along line 5-5 of FIG. 4B with an expanded post 44 is shown in FIG. 5B. The post 44 has a hollow threaded interior 50 having a narrowing end 50a opposite to the spherical portion 48. The post 44 further includes at least one lengthwise cut 56, and preferably two centered lengthwise cuts 56. A ball 52 resides between the narrowing end 50a and a set screw 54. A tool may be inserted through the passage 48 into a shaped recess 49 (preferably a hexagonal cross-section) to advance the set screw 54 and the ball 50 against the narrowed end 50b. The advancing of the ball 52 expands the post 44 to retain the position of the positioning member 18a after adjustment.

Figure 6:
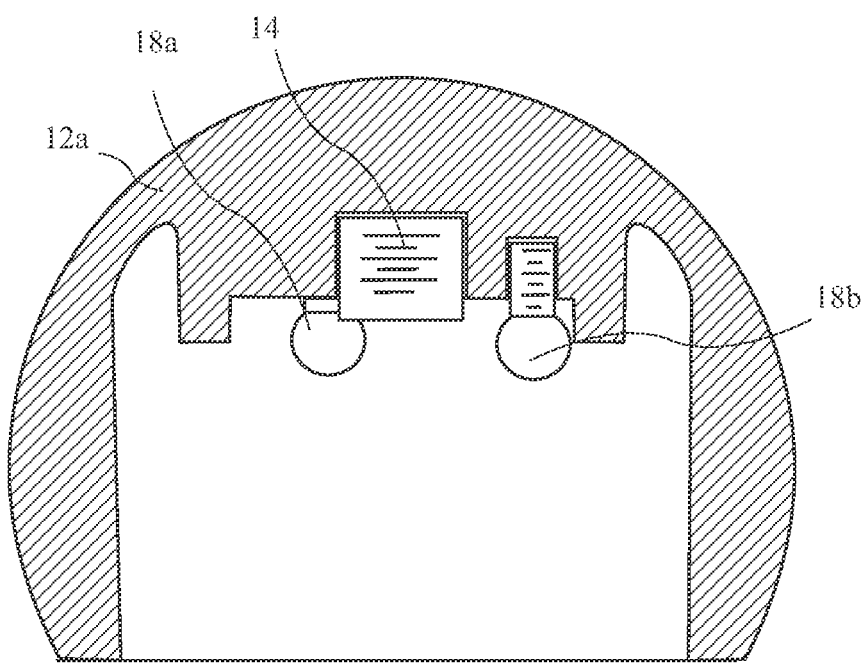
FIG. 6 shows a cross-sectional view of a hollowed out scanning laser target sphere according to the present invention.

A cross-sectional view of a hollowed out scanning laser target sphere 12a is shown in FIG. 6. The hollowed out scanning laser target sphere 12a is lighter in weight and provides advantages in larger diameter laser target spheres.

While the invention herein disclosed has been described by means of specific embodiments and applications thereof, numerous modifications and variations could be made thereto by those skilled in the art without departing from the scope of the invention set forth in the claims.

We claim:

1. A laser target sphere comprising:
    a body;
    a truncated spherical exterior of the body;
    a cavity inside the body and having an open bottom and a ceiling; and
    three positioning members fixed to the ceiling of the cavity;
    wherein each of the three positioning members comprise a spherical portion facing down and a post fixed to the body.

2. The laser target sphere of claim 1, wherein the truncated spherical exterior has a truncation angle (TA) of less than 180 degrees.

3. The laser target sphere of claim 2, wherein the truncated spherical exterior has a truncation angle (TA) between 116 degrees and 152 degrees.

4. The laser target sphere of claim 1, wherein the spherical portions of the three positioning members reside in a common horizontal plane.

5. The laser target sphere of claim 1, wherein each post of the three positioning members includes:
    a hollow threaded interior having a narrowing end opposite to the spherical portion;
    at least one longitudinal cut;
    a set screw threadably residing in the hollow threaded interior; and
    a ball residing in the hollow threaded interior between the set screw and the narrowing end.

6. The laser target sphere of claim 1, wherein each spherical portion includes a non-round shaped vertical passage aligned with the post, each vertical passage having a cross-section allowing free rotation of a tool engaged with the set screw.

7. The laser target sphere of claim 1, wherein the spherical portions are made from tungsten carbide.

8. The laser target sphere of claim 1, wherein the spherical portions are attached to the post by brazing.

9. The laser target sphere of claim 8, wherein the base of the body comprises an annular ring.

10. The laser target sphere of claim 1, further including a magnet fixed to the ceiling and generally centered between the three positioning members.

11. The laser target sphere of claim 1, wherein the cavity includes a conical portion reaching down to a base of the body and a cylindrical portion reaching up from the conical portion to the ceiling.

12. The laser target sphere of claim 1, wherein the three positioning members are configured to concentrically position the laser target sphere on a Spherical Mounted Retroreflector (SMR).

13. The laser target sphere of claim 1, wherein a center of the body is at least 0.92 inches above a base of the body.

14. The laser target sphere of claim 13, wherein a center of the body is between 0.92 and 0.98 inches above a base of the body.

15. The laser target sphere of claim 14, wherein a center of the body is about 0.95 inches above a base of the body.

16. A laser target sphere comprising:
    a body;
    a truncated spherical exterior of the body;
    a cavity inside the body and having an open bottom and a ceiling; and
    three positioning members fixed to the ceiling of the cavity;
    further including a magnet fixed to the ceiling and generally centered between the three positioning members, wherein the magnet is vertically adjustable to provide clearance for a second sphere residing in the cavity to support the target sphere.

17. The laser target sphere of claim 16, wherein the magnet threadedly engages the body to provide vertical adjustment of the magnet.

18. A laser target sphere comprising:
    a body;
    a truncated spherical exterior of the body having a truncation angle (TA) less than 180 degrees;

a cavity inside the body and having an open bottom and a ceiling; and three positioning members, each comprising a spherical portion facing down and a post fixed to the ceiling of the cavity, wherein each post of the three positioning members includes:
- a hollow threaded interior having a narrowing end opposite to the spherical portion;
- at least one longitudinal cut;
- a set screw threadably residing in the hollow threaded interior; and
- a ball residing in the hollow threaded interior between the set screw and the narrowing end; and each spherical portion includes a non-round shaped vertical passage aligned with the post, each vertical passage having a cross-section allowing free rotation of a tool engaged with the set screw.

19. A laser target sphere comprising:

a body having a center and an annular base;

a truncated spherical exterior of the body, the center of the body between 0.92 and 0.98 inches above the annular base;

a cavity inside the body and having an open bottom and a ceiling; and three positioning members configured to concentrically position the laser target sphere on a Spherical Mounted Retroreflector (SMR), each comprising a spherical portion facing down brazed to a post fixed to the ceiling of the cavity, wherein each post of the three positioning members includes:
- a hollow threaded interior having a narrowing end opposite to the spherical portion;
- at least one longitudinal cut;
- a set screw threadably residing in the hollow threaded interior; and
- a ball residing in the hollow threaded interior between the set screw and the narrowing end; and each spherical portion is made from tungsten carbide and includes a hexagonal vertical passage aligned with the post, each vertical passage having a cross-section configured to allow free rotation of a tool engaged with the set screw.

* * * * *